No. 838,836. PATENTED DEC. 18, 1906.
S. B. ARTHURS.
HARROW.
APPLICATION FILED SEPT. 4, 1906.
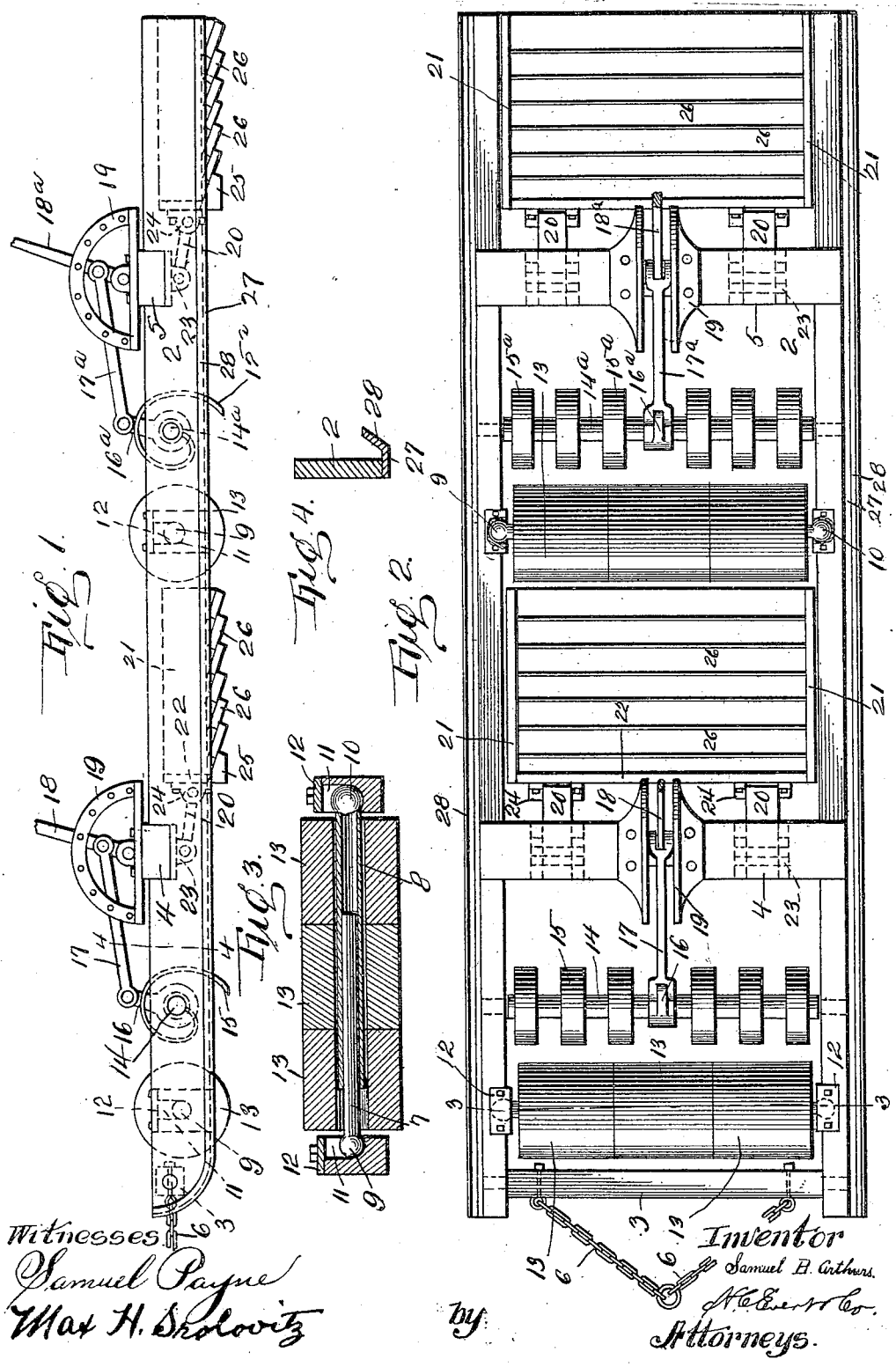
Witnesses
Samuel Payne
Max H. Skolovitz
Inventor
Samuel B. Arthurs
by
Attorneys

UNITED STATES PATENT OFFICE.

SAMUEL B. ARTHURS, OF BROOKVILLE, PENNSYLVANIA.

HARROW.

No. 838,836.  Specification of Letters Patent.  Patented Dec. 18, 1906.

Application filed September 4, 1906. Serial No. 333,187.

*To all whom it may concern:*

Be it known that I, SAMUEL B. ARTHURS, a citizen of the United States of America, residing at Brookville, in the county of Jefferson and State of Pennsylvania, have invented certain new and useful Improvements in Harrows, of which the following is a specification, reference being had therein to the accompanying drawings.

This invention relates to harrows, the primary object being to provide a harrow which will combine in a single compact machine the advantages of a rotary harrow, a spring-tooth harrow, and a device for crushing and leveling the plowed earth, leaving the ground in a proper condition for planting.

A further object of the invention is to support the several operating elements of the harrow within the frame in such a manner as to permit them to yield independently.

A further object of the invention is to provide the supporting-runners of the harrow with metallic shoes projecting laterally beyond the runners to prevent the formation of ridges in the ground when the harrow is turned.

The construction of the improvement will be fully described hereinafter in connection with the accompanying drawings, which form part of this specification, and its novel features will be defined in the appended claims.

In the drawings, Figure 1 is a side elevation of a harrow constructed in accordance with my invention. Fig. 2 is a plan view of the same. Fig. 3 is a vertical section on the line 3 3 of Fig. 2, and Fig. 4 is a section on the line 4 4 of Fig. 1.

The frame of the harrow consists of parallel runners 1 and 2, connected by a front cross-bar 3 and transverse bars 4 and 5. A draft-chain 6 is secured to the front cross-bar. Adjacent to the front bar 3 is revolubly supported a shaft comprising two telescopic sections 7 and 8, the section 7 being a rod provided in its outer end with a head 9, while the section 8 is tubular to receive the rod-section 9 and is also provided at its outer end with a head 10. The two shaft-sections are thus telescopically connected, and their heads are supported within vertical sockets 11, formed in the side bars 1 and 2 and retained therein by removable plates 12. These sockets are shaped to conform to the heads 9 10—that is, to receive said heads and yet prevent the withdrawal thereof laterally.

Upon the telescopic shaft are revolubly mounted a plurality of rollers 13, which together form a continuous roller, but each of said sections is capable of revolving independently of the others. Adjacent to the rollers 13 a shaft 14 is loosely mounted in suitable bearings of the frame, said shaft carrying spring harrow-teeth 15 and being provided with a central upwardly-projecting arm 16, connected by a link 17 with a lever 18, fulcrumed upon the transverse bar 4 and adapted to engage segment-plates 19 to secure the spring-teeth at different adjustments.

In rear of the transverse bar 4 and pivotally secured thereto by links 20 is a frame comprising parallel side bars 21 and a front connecting-bar 22. The links 20 are pivotally secured at their forward ends in supporting-brackets 23, depending from the under side of the bar 4, and the rear ends of said links are pivotally secured between brackets 24, secured to the front of the bar 22. Between the parallel side bars 21 are secured a series of overlapping strips 25 and 26, the forward strip 25 being disposed horizontally and the remaining strips 26 at an inclination, as shown. These strips constitute what is generally known in the art as a "drag."

The mechanism thus far described comprises a complete machine adapted for certain qualities of soil; but I prefer to duplicate the working elements of the harrow, as shown in the drawings. In rear of the frame carrying the overlapping strips I mount a second roller similar to the sectional roller already described and mounted in the same manner on a telescopic shaft to permit it to yield vertically, and a second spring-tooth harrow member comprising a shaft $14^a$ and teeth $15^a$ is arranged behind the roller. This shaft $14^a$ is provided with an arm $16^a$, connected by a link $17^a$ to a lever $18^a$, similar in all respects to the same elements already described.

In rear of the cross-bar 5 is a second set of crusher-strips 25 and 26, supported by frame-bars similar to the bars 21 and 22, connected loosely to the cross-bar 5 by links 20.

To the under surface of each of the runners 1 and 2 is secured a shoe 27, extending outward beyond the outer edge of the runner and having its outer edge 28 turned upward, as shown. These lateral upwardly-turned extensions of the shoes prevent the formation of ridges in the ground when the machine is turned, the inclined surfaces of the edges 28 serving to smooth down the soil as the runners are turned.

The utility and operation of the improvement will be readily understood. The sectional rollers break up the hard lumps or clods, and when a stone or like obstruction is encountered the rollers will readily yield in their bearings. The spring-teeth are controlled by the manipulation of the levers 18 and 18ª, and the overlapped strips serve to crush the smaller particles of earth and even the ground ready for planting.

What I claim, and desire to secure by Letters Patent, is—

1. In a harrow, the combination with supporting-runners, of a shaft loosely mounted in bearings of said runners and comprising telescopic sections, and a plurality of rollers revolubly mounted on said telescopic shaft.

2. In a harrow, the combination with supporting-runners, formed with vertical bearings, of a telescopic shaft comprising a tubular member and a rod member, each provided with a head on its outer end, and a plurality of rollers revolubly mounted on said shaft.

In testimony whereof I affix my signature in the presence of two witnesses.

SAMUEL B. ARTHURS.

Witnesses:
ARTHUR B. STEWART,
GRANT SCHEAFURCKER.